United States Patent
Samal

(10) Patent No.: US 10,805,969 B2
(45) Date of Patent: Oct. 13, 2020

(54) METHOD FOR DETERMINING LOCATION OF USER EQUIPMENT (UE) USING PORTABLE PSEUDO BASE STATION IN LTE

(71) Applicant: Octasic Inc, Montreal (CA)

(72) Inventor: Ashutosh Samal, Bangalore (IN)

(73) Assignee: OCTASIC INC, Montreal (CA)

(*) Notice: Subject to any disclaimer, the term of this patent is extended or adjusted under 35 U.S.C. 154(b) by 9 days.

(21) Appl. No.: 16/224,241

(22) Filed: Dec. 18, 2018

(65) Prior Publication Data

US 2020/0178322 A1    Jun. 4, 2020

(51) Int. Cl.
| | |
|---|---|
| H04W 76/11 | (2018.01) |
| H04W 76/27 | (2018.01) |
| H04W 24/10 | (2009.01) |
| H04B 17/318 | (2015.01) |
| H04W 74/08 | (2009.01) |
| H04W 68/02 | (2009.01) |
| H04L 29/06 | (2006.01) |
| H04W 76/50 | (2018.01) |

(52) U.S. Cl.
CPC .......... *H04W 76/11* (2018.02); *H04B 17/318* (2015.01); *H04L 63/0876* (2013.01); *H04W 24/10* (2013.01); *H04W 68/02* (2013.01); *H04W 74/0833* (2013.01); *H04W 76/27* (2018.02); *H04W 76/50* (2018.02)

(58) Field of Classification Search
CPC . H04W 76/11; H04W 74/0833; H04W 24/10; H04W 76/27; H04L 63/0876
See application file for complete search history.

(56) References Cited

U.S. PATENT DOCUMENTS

| | | | | |
|---|---|---|---|---|
| 2011/0269449 A1* | 11/2011 | Kazmi | .................. | H04B 7/024 455/422.1 |
| 2013/0130694 A1* | 5/2013 | Kherani | ............ | H04W 28/0263 455/437 |
| 2016/0192269 A1* | 6/2016 | Kim | ...................... | H04W 36/30 370/332 |
| 2018/0192436 A1* | 7/2018 | Yi | ........................ | H04W 72/14 |

\* cited by examiner

*Primary Examiner* — Mohammad S Anwar

(57) ABSTRACT

Embodiments herein provide a method for determining a location of a user equipment (UE) using a portable pseudo base station. The method includes establishing, by the portable PBS, a RRC connection with the UE associated with a main base station (MBS), wherein signal strength between the UE and the portable PBS is stronger than a signal strength between the UE and the MBS. Further, the method also includes receiving, by the portable PBS, an intra frequency measurement report from the UE and determining, by the portable PBS, the location of the UE using the intra frequency measurement report.

26 Claims, 15 Drawing Sheets

METHOD FOR DETERMINING LOCATION OF USER EQUIPMENT (UE) USING PORTABLE PSEUDO BASE STATION IN LTE

TECHNICAL FIELD

The embodiments herein relate to location and identification of wireless devices. More particularly relates to a method for determining a location of a user equipment (UE) using a portable pseudo base station in LTE. The present application is based on, and claims priority from Indian application No. 201841045014 filed on Nov. 29, 2018 the disclosure of which is hereby incorporated by reference

BACKGROUND

During events of public interest such as emergency situations, natural disasters, search and rescue operations and surveillance operations rescuing individuals is of utmost importance. Further, electronic devices possessed by the individuals can be used to track the individuals. In most cases of tracking electronic devices a silent call is used. However, when the silent-call is on, the user of the electronic device may not be able to get incoming calls and may become suspicious or the user may be trying to make a call and the electronic device will endlessly try to place the call without success. In case of security related events the user may be fearful of being discovered and turn off the electronic device, thus severing silent-call.

In another scenario, a location of the electronic device is tracked based on the user activity after a specific time lag by a mobile operator. Therefore, the time lag may hinder the search and rescue operations.

The above information is presented as background information only to help the reader to understand the present invention. Applicants have made no determination and make no assertion as to whether any of the above might be applicable as prior art with regard to the present application.

OBJECT OF INVENTION

The principal object of the embodiments herein is to provide a method for determining a location of a user equipment (UE) using a portable pseudo base station.

Another object of the embodiments herein is to establish a RRC connection between the portable PBS and the UE which is associated with a main base station (MB S).

Another object of the embodiments herein is to provide signal strength between the UE and the portable PBS such that the signal strength between the UE and the portable PBS is stronger than signal strength between the UE and the MBS.

Another object of the embodiments herein is to determine a Tracking Area Code (TAC) by the portable PBS while the UE is receiving the TAC form the MBS.

Another object of the embodiments herein is to receive by the portable PBS, an intra frequency measurement report from the UE.

Another object of the embodiments herein is to determine the location of the UE using the intra frequency measurement report by the portable PBS.

Another object of the embodiments herein is to configure the TAC of the MBS and an international mobile subscriber identity (IMSI) of the UE to the portable PBS.

SUMMARY

Accordingly the embodiments herein provide a method for determining a location of a user equipment (UE) using a portable pseudo base station. The method includes establishing, by the portable PBS, a RRC connection with the UE associated with a main base station (MBS), where signal strength between the UE and the portable PBS is stronger than signal strength between the UE and the MBS. Further, the method also includes receiving, by the portable PBS, an intra frequency measurement report from the UE and determining, by the portable PBS, the location of the UE using the intra frequency measurement report.

Accordingly the embodiments herein provide a portable pseudo base station for determining a location of user equipment (UE). The portable PBS includes a memory, a processor coupled to the memory, a radio communication engine coupled to the memory and the processor. The radio communication engine is configured to establish a RRC connection with the UE associated with a main base station (MBS), where signal strength between the UE and the portable PBS is stronger than signal strength between the UE and the MBS and receive an intra frequency measurement report from the UE. Further, the radio communication engine is configured to determine the location of the UE using the intra frequency measurement report.

Accordingly the embodiments herein provide user equipment (UE) attached to a portable pseudo base station. The UE includes a memory, a processor coupled to the memory, a communicator and a function management engine coupled to the memory and the processor. The function management engine is configured to attach to the portable PBS based on a RRC connection associated with a main base station (MBS), where signal strength between the UE and the portable PBS is stronger than signal strength between the UE and the MBS. The function management engine is also configured to initiate a Mobile Originated Voice/Data Call and send a RACH request to the portable PBS. Further, the function management engine receives a RACH Response (RAR) from the portable PBS and sends a RRC Connection Request to the portable PBS, where the RRC Connection Request includes a SAE Temporary Mobile Subscriber Identity (S-TMSI). Furthermore, the function management engine receives a RRC Connection Setup message from the portable PBS, sends a RRC Connection Setup Complete message with at least one of a NAS Service Request for the Data Call and a NAS Extended Service Request for the Voice Call to the portable PBS and receives an identity request from the portable PBS to send the IMSI to the portable PBS. The function management engine also sends an identity response to the portable PBS with the IMSI receives a RRC Connection Reconfiguration message to send the intra frequency measurement report from the portable PBS and sends a RRC connection reconfiguration complete message to the portable PBS. Furthermore, the function management engine sends the intra frequency measurement report to the portable PBS and receives a RRC Connection release message from the portable PBS. Furthermore, the function management engine also receives continuous paging messages from the portable PBS.

Accordingly the embodiments herein provide a system for determining a location of a user equipment (UE) using a portable pseudo base station. The system includes a main base station (MBS), the user equipment (UE), where the UE is attached to the MBS and the portable pseudo base station (portable PBS) is configured for determining the location of the UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
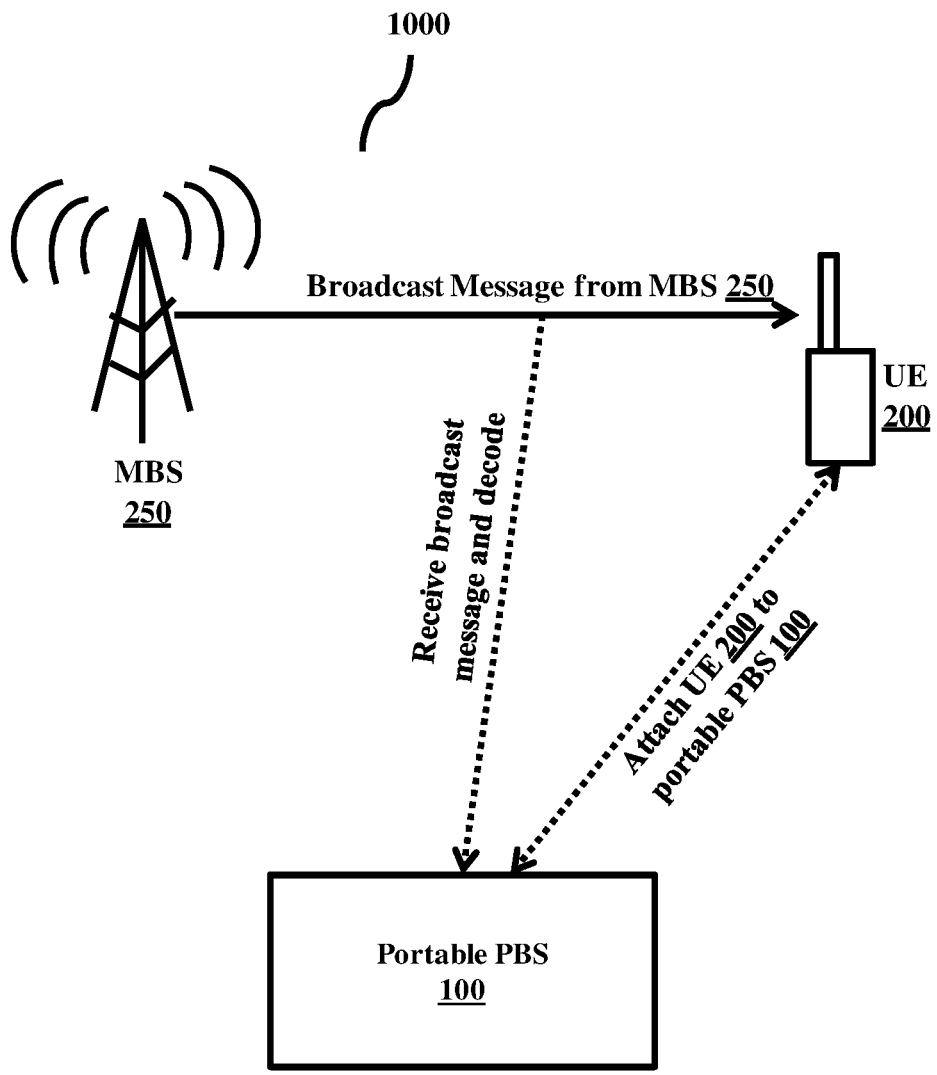
FIG. 1 illustrates an example environment including a portable pseudo base station (PBS), a main base station (MBS) and an user equipment, where a location of the UE is determined using the portable PBS, according to the embodiments as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a method for determining a location of a user equipment (UE) using a portable pseudo base station. The method includes establishing, by the portable PBS, a RRC connection with the UE associated with a main base station (MBS), wherein signal strength between the UE and the portable PBS is stronger than signal strength between the UE and the MBS. Further, the method also includes receiving, by the portable PBS, an intra frequency measurement report from the UE and determining, by the portable PBS, the location of the UE using the intra frequency measurement report.

In an embodiment, the signal strength between the UE and the PBS is controlled by moving the portable PBS.

In an embodiment, establishing, by the portable PBS, the RRC connection with the UE associated with the MBS includes determining a Tracking Area Code (TAC) while the UE is receiving the TAC form the MBS, wherein the TAC is determined by decoding a broadcast message sent by the MBS to the UE and configuring the TAC of the MBS and an international mobile subscriber identity (IMSI) of the UE to the portable PBS. Further, the method includes performing an attachment of the UE to the portable PBS by sending an IMSI paging message to the UE, wherein the attachment of the UE to the portable PBS includes the UE performing an attach procedure.

In an embodiment, performing, an attachment of the UE to the Portable PBS by sending a paging message to the UE includes sending, by the portable base station, the paging message with an international mobile subscriber identity (IMSI) to the UE and receiving, by the portable base station, an attach request from the UE. The method includes sending, by the portable base station, an identity request to the UE to receive the IMSI from the UE and receiving, by the portable base station, an identity response from the UE with the IMSI. Further, the method includes sending, by the portable base station, a RRC Connection Reconfiguration message to receive the intra frequency measurement report and receiving, by the portable base station, the RRC connection reconfiguration complete message from the UE. Further, the method also includes receiving, by the portable base station, the intra frequency measurement report from the UE and initiating, by the portable base station, a handover of the UE with a pseudo Physical Cell Identifier (PCI) and a pseudo C-RNTI. Furthermore, the method includes switching-off, by the portable base station, transmission of power by the portable PBS for a predetermined time period, wherein the UE registers again to the MBS during the switching-off of the transmission of power.

In an embodiment, establishing, by the portable PBS, the RRC connection with the UE includes determining, by the portable base station, that the UE initiated a Mobile Originated Voice/Data Call and receiving, by the portable base station, a RACH request from the UE. Further, the method includes sending, by the portable base station, a RACH Response (RAR) to the UE and receiving, by the portable base station, a RRC Connection Request from the UE, wherein the RRC Connection Request includes a SAE Temporary Mobile Subscriber Identity (S-TMSI). Further, the method also includes retrieving, by the portable base station, the S-TMSI of the UE assigned by the MBS and sending, by the portable base station, a RRC Connection Setup message to the UE. Further, the method also includes receiving, by the portable base station, a RRC Connection Setup Complete message with at least one of a NAS Service Request for the Data Call and a NAS Extended Service Request for the Voice Call and sending, by the portable base station, an identity request to the UE to receive the IMSI from the UE. Further, the method includes receiving, by the portable base station, an identity response from the UE with the IMSI and sending, by the portable base station, a RRC Connection Reconfiguration message to receive the intra frequency measurement report. Furthermore, the method includes receiving, by the portable base station, a RRC connection reconfiguration complete message from the UE and receiving, by the portable base station, the intra frequency measurement report from the UE. Finally, the method includes sending, by the portable base station, a RRC Connection release message; and initiating, by the portable base station, a continuous paging with the S-TMSI of the UE.

In an embodiment, the method further includes determining, by the UE, that the S-TMSI provided by the portable base station in the continuous paging is valid and sending, by the UE, a service request to the portable PBS. Further, the method includes initiating, by the UE, at least one of a Detach Procedure, an Attach Procedure and a Tracking Area Update Procedure with the portable PBS.

In an embodiment, initiating, by the UE, the tacking area update procedure includes determining, by the UE, that a periodic tracking area update timer is expired and sending, by the UE, a Tracking area update request to the portable PBS, in response to determining that the periodic tracking area update timer is expired. Further, the method includes receiving, by the UE, the identity request from the portable PBS and sending, by the UE, the identity response to the portable PBS, wherein the identity response includes the IMSI. Further, the method also includes receiving, by the UE, a RRC Connection Reconfiguration message to send the intra frequency measurement report and sending, by the UE, a RRC connection reconfiguration complete message. Furthermore, the method includes sending by the UE, the intra frequency measurement report.

In an embodiment, the SAE temporary mobile subscriber identity (S-TMSI) is valid for a specific period of time.

In an embodiment, the S-TMSI is allocated to the UE by the MBS.

In an embodiment, the intra frequency measurement report includes a Reference Signals Received Power (RSRP) and a Reference Signal Received Quality (RSRQ).

In an embodiment, determining, by the portable PBS, the location of the UE using the intra frequency measurement report includes comparing the RSRP and the RSRQ of the UE received in the intra frequency measurement report with a power threshold and ascertaining that the UE is at a location close to the portable PBS, when the RSRP and the RSRQ is below the power threshold. Further, the method includes ascertaining that the UE is at a location farther from the portable PBS, when the RSRP and the RSRQ is above the power threshold.

In an embodiment, the UE initiates the detach procedure by triggering at least one of a switch off and an airplane mode on.

In an embodiment, the portable PBS detects the detach procedure initiated by the UE based on a RRC IDLE mode detach request.

In an embodiment, the portable PBS detects the detach procedure initiated by the UE based on a RRC Connected mode detach request.

In the conventional methods and systems, the IMSI and the IMEI number of the target UE are know and a network operator determines the location of the target UE based on the IMSI and the IMEI number. However, the location of the target UE cannot be determined in real-time and can only be tracked after a time lag. Unlike to the conventional methods and systems, the proposed method allows the real-time tracking of the location of the target UE without any time lag. Therefore, the proposed method provides highly valuable inputs in real-time especially in search and rescue operations in times of calamities.

In the conventional methods and systems, when the target UE is under surveillance, the target UE is imposed an emergency mode or a no-service mode. Therefore, the user of the target UE may switch-off the target UE which makes the tracking of the target UE impossible. Unlike to the conventional methods and systems, in the proposed method the target UE will be in service mode and indicate the same by displaying a 4G symbol. Therefore, there is no scope of suspicion to the user of the target UE due to sudden switching-off of the service. However a silent call is run in the background to continuously track the location of the target UE.

In the conventional methods and systems, the target UE under surveillance is in the no-service mode. Hence, the target UE cannot initiate any emergency call CS Fallback, etc which will be helpful in locating the target UE. Unlike to the conventional methods and systems, in the proposed method the target UE is in the service mode and hence is allowed to initiate the emergency call, etc which makes the process of locating the target UE easier.

Unlike to the conventional methods and systems, in the proposed method the IMSI is used AS an input to track the target UE.

In the conventional methods and systems, the target UE can be tracked by the portable PBS only for a specific duration of time. Unlike to the conventional methods and systems, in the proposed method the target UE can be tracked for unlimited duration of time.

Referring now to the drawings, and more particularly to FIGS. 1 through 10, where similar reference characters denote corresponding features consistently throughout the figures, there are shown preferred embodiments.

FIG. 1 illustrates an example environment 1000 including the portable pseudo base station (PBS) 100, the main base station (MBS) 250 and the user equipment 200, where the location of the UE 200 is determined using the portable PBS 100, according to the embodiments as disclosed herein.

Referring to the FIG. 1, consider a scenario of search and rescue where the user of the UE 200, the IMEI number of which is known is trapped in a specific environment 1000 and has to be tracked. The environment 1000 includes the portable base station 100, the user equipment (UE) 200 and the main base station 250. The environment 1000 can be a place, an area, a locality or the like, which is affected with natural calamity or a disaster, where the UE 200 with the specific IMEI number needs to be tracked as part of the search and rescue operation or surveillance operation, and the like.

The MBS 250 synchronizes with the UE 200 by sending a broadcast message. The broadcast message includes the Tracking Area Code (TAC). The UE 200 is registered to the MBS 250. The portable PBS 100 intercepts the broadcast message and decodes the broadcast message to determine the TAC. Further, the portable PBS 100 configures itself with the TAC of the MBS 250.

A pseudo cell created by the portable PBS 100, having the same TAC as the MBS 250 is moved closer to a possible location of the UE 200. The UE 200 switches to the pseudo cell, as the pseudo cell which is closer to the UE 200 has higher power value and best quality signal. However the portable PBS 100 will not be aware of the UE 200 having switches to the portable PBS 100 unless the UE 200 initiates a Mobile originated call (MOC) such as a voice call/data call. Further, when an application running in background in the UE 200 tries to connect to network by sending a service request and the TMSI to the portable PBS 100. On receiving the TMSI from the UE 200, the portable PBS 100 begins paging with the TMSI to the UE 200. The portable PBS 100 again receives the service request, after receiving which the portable PBS 100 may release the MOC. Further, the portable PBS 100 triggers measurement of the signal of the portable PBS 100 at the UE 200. The UE 200 then sends the intra frequency measurement report based on which the portable PBS 100 determines the location f the UE 200. The location of the UE 200 is determined silently without downgrading the UE 200 to 3G/2G.

Figure 2A:
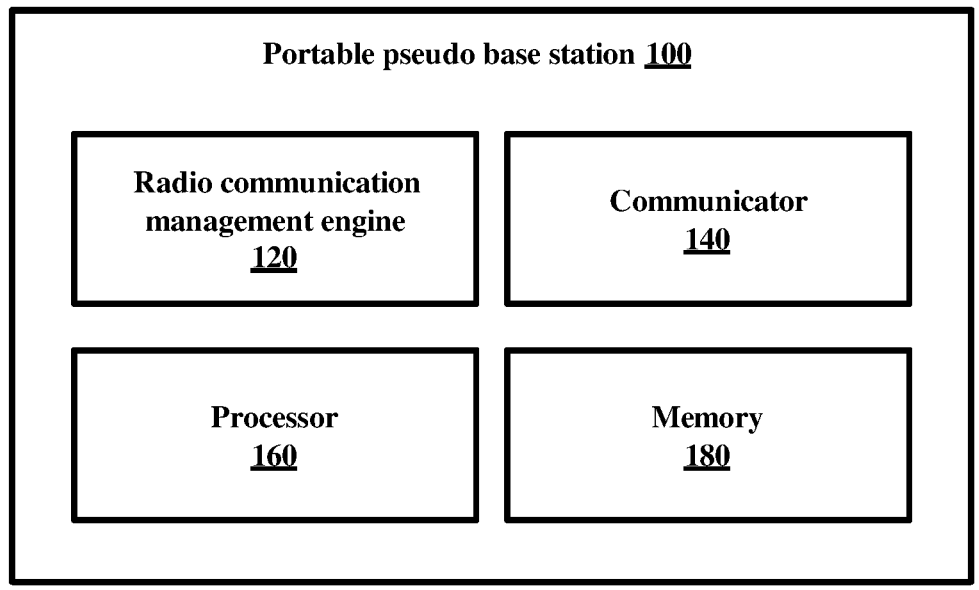
FIG. 2A is a block diagram of the portable PBS for determining the location of the UE, according to an embodiment as disclosed herein.

FIG. 2A is a block diagram of the portable PBS 100 for determining the location of the UE 200, according to an embodiment as disclosed herein.

Referring to the FIG. 2A, the portable PBS 100 includes a radio communication management engine 120, a communicator 140, a processor 160 and a memory 180.

In an embodiment, the radio communication management engine 120 is configured to establish the RRC connection with the UE 200. The UE 200 is already attached to the MBS 250. The signal strength between the UE 200 and the portable PBS 100 is made stronger than the signal strength between the UE 200 and the MBS 250, so that the UE 200 attaches to the portable PBS 100. Further, the radio communication management engine 120 is configured to receive the intra frequency measurement report from the UE 200. The intra frequency measurement report includes a Reference Signals Received Power (RSRP) and a Reference Signal Received Quality (RSRQ). Further, the radio communication management engine 120 is configured to determine the location of the UE 200 using the intra frequency measurement report.

In an embodiment, the communicator 140 includes a transceiver which is configured to communicate with the UE 200 and send and receive the various signaling messages.

In an embodiment, the processor 250 is configured to interact with the hardware elements such as the radio communication management engine 120, the communicator 140 and the memory 180.

In an embodiment, the memory 180 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 180 may, in some examples, be considered a non-transitory storage medium. The term "non-transitory" may indicate that the storage medium is not embodied in a carrier wave or a propagated signal. However, the term "non-transitory" should not be interpreted that the memory 180 is non-movable. In some examples, the memory 180 is configured to store larger amounts of information than the memory. In certain examples, a non-transitory storage medium may store data that can, over time, change (e.g., in Random Access Memory (RAM) or cache).

Although the FIG. 2A shows the hardware elements of the portable PBS 100 but it is to be understood that other embodiments are not limited thereon. In other embodiments, the portable PBS 100 may include less or more number of elements. Further, the labels or names of the elements are used only for illustrative purpose and does not limit the scope of the invention. One or more components can be combined together to perform same or substantially similar function of determining the location of the UE 200.

Figure 2B:
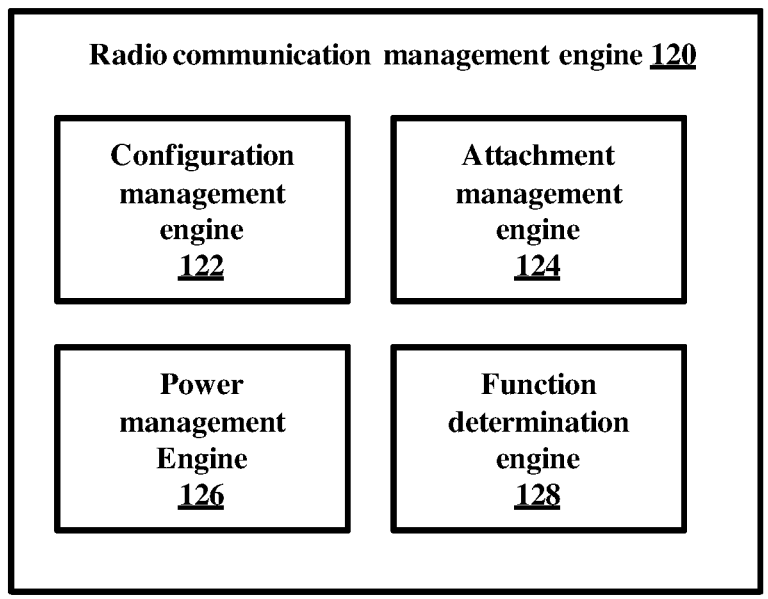
FIG. 2B is a block diagram of a radio communication management engine of the portable PBS, according to an embodiment as disclosed herein.

FIG. 2B is a block diagram of the radio communication management engine 120 of the portable PBS 100, according to an embodiment as disclosed herein.

The radio communication management engine 120 includes a configuration management engine 122, an attachment management engine 124, a power management engine 126 and a function determination engine 128.

Initially the UE 200 synchronizes with the MBS 250 and obtains a MIB or Master Information Block (MIB). After the initial synchronization, the UE 200 begins to listen to a System Information Block Type 1 (SIB1) which is carrying cell access related information. The SIB1 includes the Tracking Area Code (TAC) which identifies a tracking area for paging the users.

In an embodiment, the configuration management engine 122 is configured to receive a broadcast message (i.e., the SIB1), during the initial synchronization of the UE 200 with the MBS 250. Further, the configuration management engine 122 is configured to decode the broadcast message and determine the TAC. Further, the configuration management engine 122 configures the TAC of the MBS 250 and an international mobile subscriber identity (IMSI) of the UE 200 to the portable PBS 100.

In an embodiment, the attachment management engine 124 is configured to send the paging message with the IMSI to the UE 200 and receive the attach request from the UE 200. Further, the attachment management engine 124 is configured to send the identity request to the UE 200 and receive the identity response from the UE 200 with the IMSI. The attachment management engine 124 is also configured to send the RRC Connection Reconfiguration message requesting for the intra frequency measurement report and receive the RRC connection reconfiguration complete message from the UE 200. Further, the attachment management engine 124 is also configured to receive the intra frequency measurement report from the UE 200. Further, the intra frequency measurement report is then used to determine the location of the UE 200 with respect to the portable PBS 100.

The attachment management engine 124 is further configured to initiate the handover of the UE 200 with a pseudo Physical Cell Identifier (PCI) and a pseudo cell Radio Network Temporary Identifier (C-RNTI). The attachment management engine 124 is then switches-off the transmission of power by the portable PBS 100 for a predetermined time period. During the predetermined period of time, the UE 200 registers again to the MBS 250.

In another embodiment, the attachment management engine 124 is configured to establish the RRC connection with the UE 200 by determining that the UE 200 has initiated the Mobile Originated Voice/Data Call and receive the Random Access Procedure (RACH) request from the UE 200. Further, the attachment management engine 124 is also configured to send a RACH Response (RAR) to the UE 200 and receive the RRC Connection Request from the UE 200. The RRC Connection Request comprises the SAE Temporary Mobile Subscriber Identity (S-TMSI) and retrieves the S-TMSI of the UE 200 assigned by the MBS 250. The attachment management engine 124 sends a RRC Connection Setup message to the UE 200 and receives a RRC Connection Setup Complete message with at least one of the NAS Service Request for the Data Call and the NAS Extended Service Request for the Voice Call. However, the S-TMSI is valid only for a specific period of time. Further, the attachment management engine 124 is sends the identity request to the UE to receive the IMSI from the UE 200 and receive the identity response from the UE 200 with the IMSI. The attachment management engine 124 also sends the RRC Connection Reconfiguration message to receive the intra frequency measurement report, receives the RRC connection reconfiguration complete message from the UE 200 and receives the intra frequency measurement report from the UE 200. Further, the attachment management engine 124 is configured to send the RRC Connection release message and initiate the continuous paging with the S-TMSI of the UE 200.

In another embodiment, the attachment management engine 124 is configured to receive at least one of the Detach Procedure, the Attach Procedure and the Tracking Area Update Procedure from the UE 200. The attachment management engine 124 detects the detach procedure initiated by the UE 200 based on at least one of the RRC IDLE mode detach request and the RRC Connected mode detach request.

In an embodiment, the power management engine 126 is configured to receive the intra frequency measurement report from the UE 200. Further, the power management engine 126 is configured to compare the RSRP and the RSRQ of the UE 200 received in the intra frequency measurement report with a power threshold. The power threshold is predetermined and set at a value which is optimal for a specific location of the UE 200. Further, the power management engine 126 is also configured to ascertain that the UE 200 is at the location which is closer to the portable PBS 100, when the RSRP and the RSRQ is below the power threshold and that the UE 200 is at the location away from the portable PBS 100, when the RSRP and the RSRQ is beyond the power threshold. Furthermore, the power management engine 126 is configured to determine the location of the UE 200 based on the RSRP and the RSRQ with respect to the power threshold.

In an embodiment, the function determination engine 128 is configured to determine the functions which are to be allowed to be performed by the UE 200. For example, when there is a mobile terminated call for the UE 200, the function determination engine 128 determines whether the MTC can be allowed or blocked by the portable PBS 100. The function determination engine 128 enables the choice of either providing full functionality services or suspending some or all services of the UE 200 (e.g. data packet handling, incoming call, outgoing call, incoming SMS, outgoing SMS, etc.).

Figure 3:
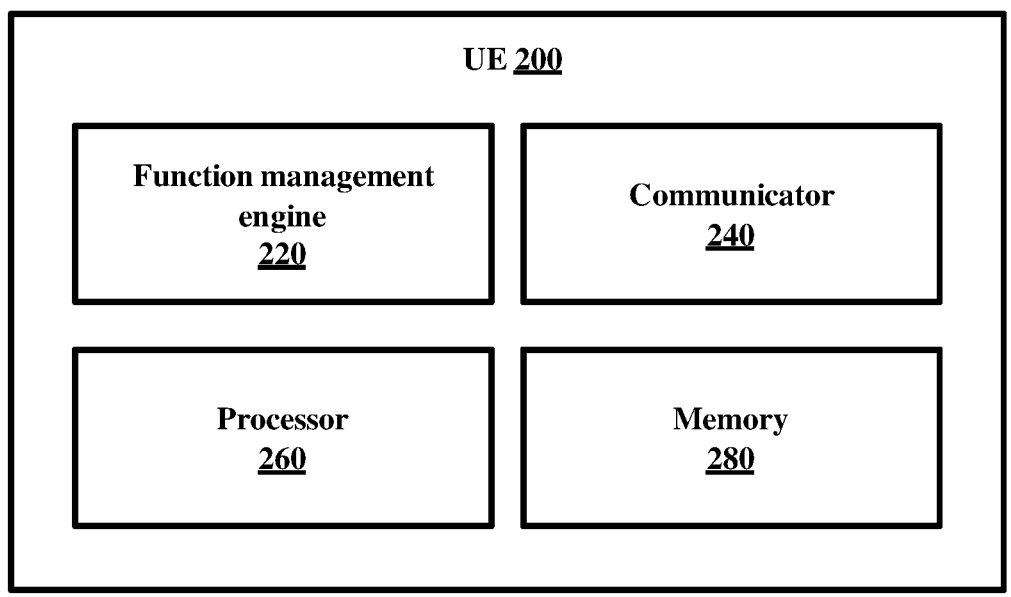
FIG. 3 is a block diagram of the UE, the location of which is determined using the portable PBS, according to an embodiment as disclosed herein.

FIG. 3 is a block diagram of the UE 200, the location of which is determined using the portable PBS 100, according to an embodiment as disclosed herein.

The UE 200 is any interactive device such as for example but not limited to a robot, a mobile phone, a smart phone, Personal Digital Assistants (PDAs), a tablet, a wearable device, a smart speaker, and the like which is compatible with 4G/LTE. Referring to the FIG. 3, the UE 200 includes a function management engine 220, a communicator 240, a processor 260 and a memory 280.

In an embodiment, the function management engine 220 is configured to receive the paging message with the IMSI from the portable PBS 100 and send the attach request to the portable PBS 100. Further, the function management engine 220 receives the identity request from the portable PBS 100 to send the IMSI to the portable PBS 100 and responds by sending the identity response which includes the IMSI. The function management engine 220 is also configured to receive the RRC Connection Reconfiguration message from the portable PBS 200 requesting for the intra frequency measurement report. The function management engine 220 sends the RRC connection reconfiguration complete message from the UE 200 followed by the intra frequency measurement report which is used to determine the location of the UE 200 by the portable PBS 100.

In another embodiment, the function management engine 220 initiates the Mobile Originated Voice/Data Call and sends the Random Access Procedure (RACH) request to the portable PBS 100. The function management engine 220 also receives the RACH Response (RAR) from the portable PBS 100 and sends the RRC Connection Request. The function management engine 220 determines that the S-TMSI provided by the portable base station 100 in the continuous paging is valid and sends the service request to the portable PBS 100. The S-TMSI is originally allocated to the UE 200 by the MBS 250. Furthermore, the function management engine 220 initiates at least one of the Detach Procedure, the Attach Procedure and the Tracking Area Update Procedure with the portable PBS 100. The UE initiates the detach procedure by triggering at least one of the switch off and the airplane mode on.

In an embodiment, the function management engine 220 initiates the tacking area update procedure by determining that the periodic tracking area update timer is expired and sending the Tracking area update request to the portable PBS 100. The function management engine 220 also receives the identity request from the portable PBS 100 and sends the identity response to the portable PBS 100. The identity response includes the IMSI. The function management engine 220 receives the RRC Connection Reconfiguration message to send the intra frequency measurement report, sends the RRC connection reconfiguration complete message and sends the intra frequency measurement report.

In an embodiment, the communicator 240 includes a transceiver which is configured to communicate with the portable PBS 100, and send and receive the various signaling messages.

In an embodiment, the processor 260 is configured to interact with the hardware elements such as the function management engine 220, the communicator 240 and the memory 280.

In an embodiment, the memory 280 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 280 may, in some examples, be considered a non-transitory storage medium. The term "non-transitory" may indicate that the storage medium is not embodied in a carrier wave or a propagated signal. However, the term "non-transitory" should not be interpreted that the memory 280 is non-movable. In some examples, the memory 280 is configured to store larger amounts of information than the memory. In certain examples, a non-transitory storage medium may store data that can, over time, change (e.g., in Random Access Memory (RAM) or cache).

Although the FIG. 3 shows the hardware elements of the UE 200 but it is to be understood that other embodiments are not limited thereon. In other embodiments, the UE 200 may include less or more number of elements. Further, the labels or names of the elements are used only for illustrative purpose and does not limit the scope of the invention. One or more components can be combined together to perform same or substantially similar function.

Figure 4A:
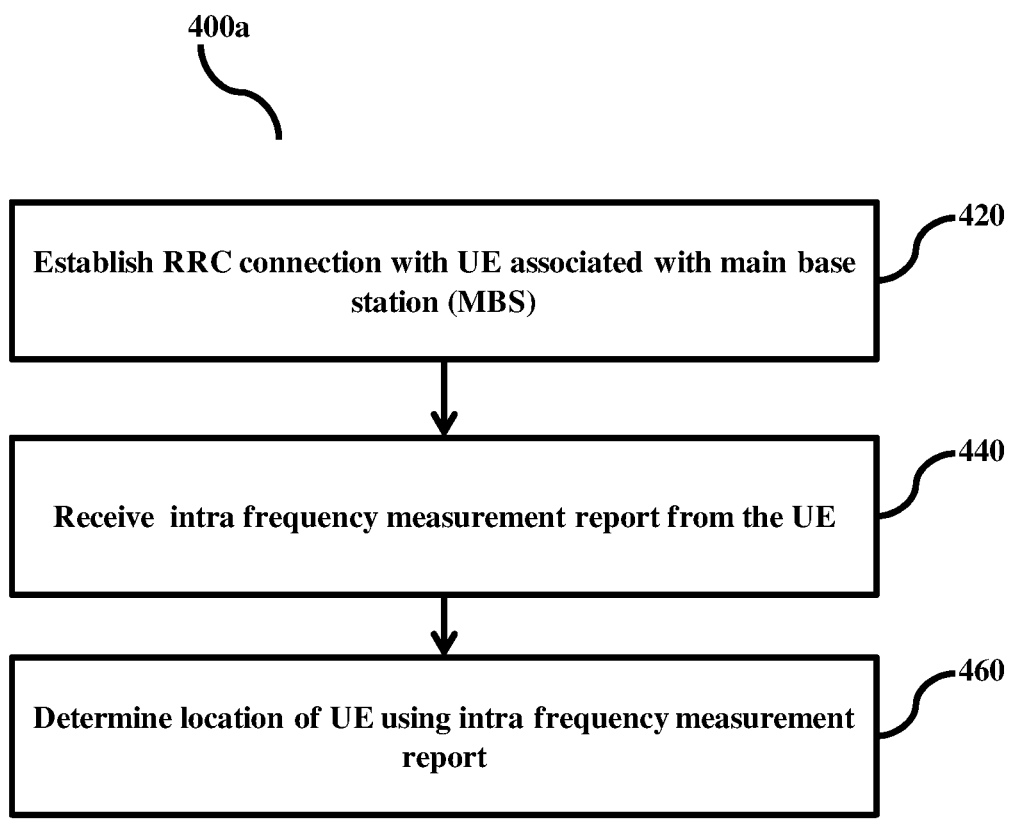
FIG. 4A is a flow chart illustrating a method for determining the location of the UE using the portable PBS, according to an embodiment as disclosed herein.

FIG. 4A is a flow chart 400a illustrating a method for determining the location of the UE using the portable PBS, according to an embodiment as disclosed herein.

Referring to the FIG. 4A, at step 420, the portable PBS 100 establishes the RRC connection with the UE 200 associated with the MBS 250. For example, in the portable PBS 100 as illustrated in the FIG. 2A, the Radio communication management engine 120 is configured to establishes the RRC connection with the UE 200 associated with the MBS 250.

At step 440, the portable PBS 100 receives the intra frequency measurement report from the UE 200. For example, in the portable PBS 100 as illustrated in the FIG. 2A, the Radio communication management engine 120 is configured to receive the intra frequency measurement report from the UE 200.

At step 460, the portable PBS 100 determines the location of the UE 200 using the intra frequency measurement report. For example, in the portable PBS 100 as illustrated in the FIG. 2A, the Radio communication management engine 120 is configured to determine the location of the UE 200 using the intra frequency measurement report.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 4B:
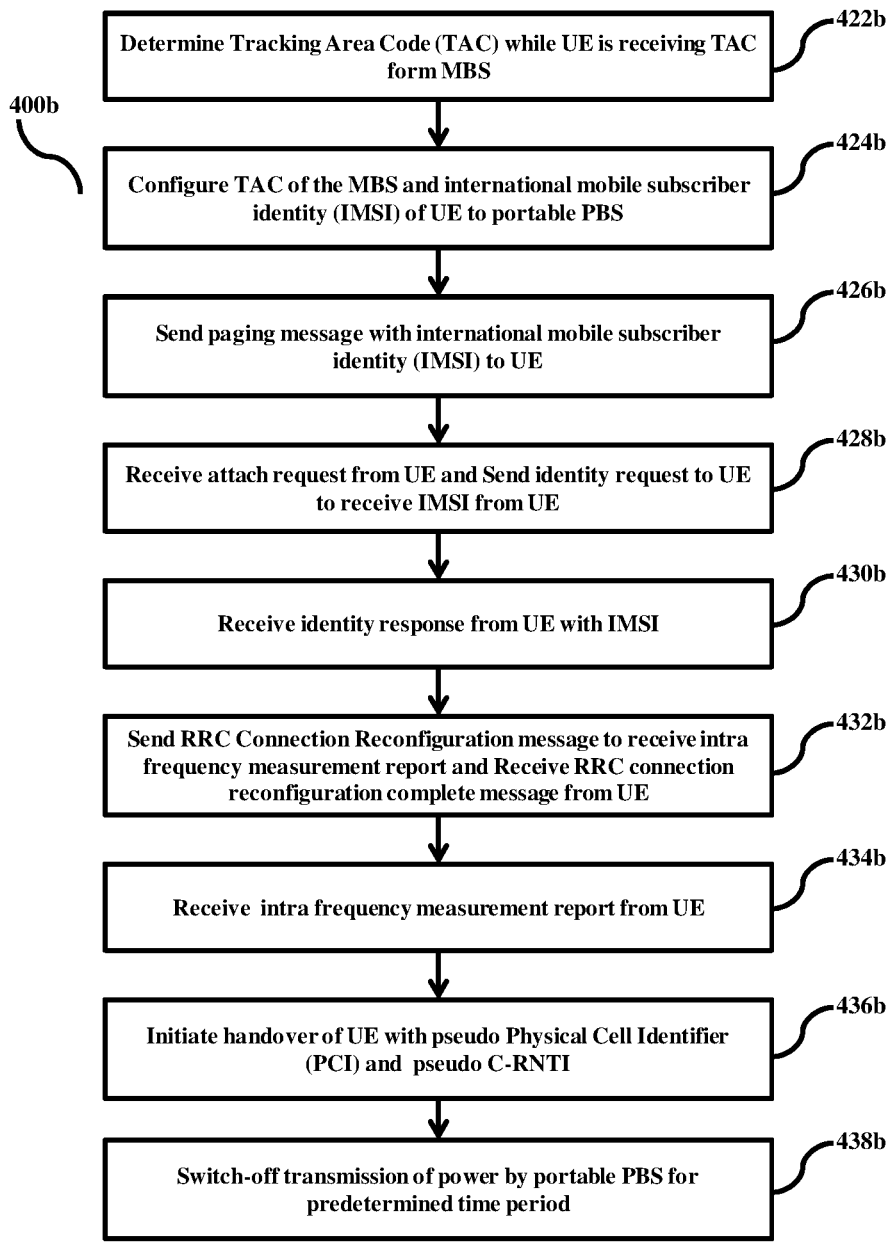
FIG. 4B is a flow chart illustrating a method for establishing a RRC connection by the portable PBS with the UE, according to an embodiment as disclosed herein.

FIG. 4B is a flow chart 400b illustrating a method for establishing a RRC connection by the portable PBS with the UE, according to an embodiment as disclosed herein.

Referring to the FIG. 4B, at step 422b, the portable PBS 100 determines the Tracking Area Code (TAC) while the UE 200 is receiving the TAC form the MBS 250. For example, in the portable PBS 100 as illustrated in the FIG. 2A, the Radio communication management engine 120 is configured to determine the Tracking Area Code (TAC) while the UE 200 is receiving the TAC form the MBS 250.

At step 424b, the portable PBS 100 configures the TAC of the MBS 250 and the IMSI of the UE 200 to portable PBS 100. For example, in the portable PBS 100 as illustrated in the FIG. 2A, the Radio communication management engine 120 is configured to configure the TAC of the MBS 250 and the IMSI of the UE 200 to portable PBS 100.

At step 426b, the portable PBS 100 sends the paging message with the IMSI to the UE 200. For example, in the portable PBS 100 as illustrated in the FIG. 2A, the Radio communication management engine 120 is configured to send the paging message with the IMSI to the UE 200.

At step 428b, the portable PBS 100 receives the attach request from the UE 200 and sends the identity request to the UE 200 to receive the IMSI from the UE 200. For example, in the portable PBS 100 as illustrated in the FIG. 2A, the Radio communication management engine 120 is configured to receive the attach request from the UE 200 and send the identity request to the UE 200 to receive the IMSI from the UE 200.

At step 430b, the portable PBS 100 receives the identity response from the UE 200 with the IMSI. For example, in the portable PBS 100 as illustrated in the FIG. 2A, the Radio communication management engine 120 is configured to receive the identity response from the UE 200 with the IMSI.

At step 432b, the portable PBS 100 sends the RRC Connection Reconfiguration message to receive the intra frequency measurement report and in response receives the RRC connection reconfiguration complete message from the UE 200. For example, in the portable PBS 100 as illustrated in the FIG. 2A, the Radio communication management engine 120 is configured to send the RRC Connection Reconfiguration message to receive the intra frequency measurement report and in response receive the RRC connection reconfiguration complete message from the UE 200.

At step 434b, the portable PBS 100 receives the intra frequency measurement report from the UE 200. For example, in the portable PBS 100 as illustrated in the FIG. 2A, the Radio communication management engine 120 is configured to receive the intra frequency measurement report from the UE 200.

At step 436, the portable PBS 100 initiates the handover of the UE 200 with the pseudo Physical Cell Identifier (PCI) and the pseudo C-RNTI. For example, in the portable PBS 100 as illustrated in the FIG. 2A, the Radio communication management engine 120 is configured to initiates the handover of the UE 200 with the pseudo Physical Cell Identifier (PCI) and the pseudo C-RNTI.

At step 438b, the portable PBS 100 switches-off transmission of the power for the predetermined time period. For example, in the portable PBS 100 as illustrated in the FIG. 2A, the Radio communication management engine 120 is configured to switch-off transmission of the power for the predetermined time period.

Figure 4C:
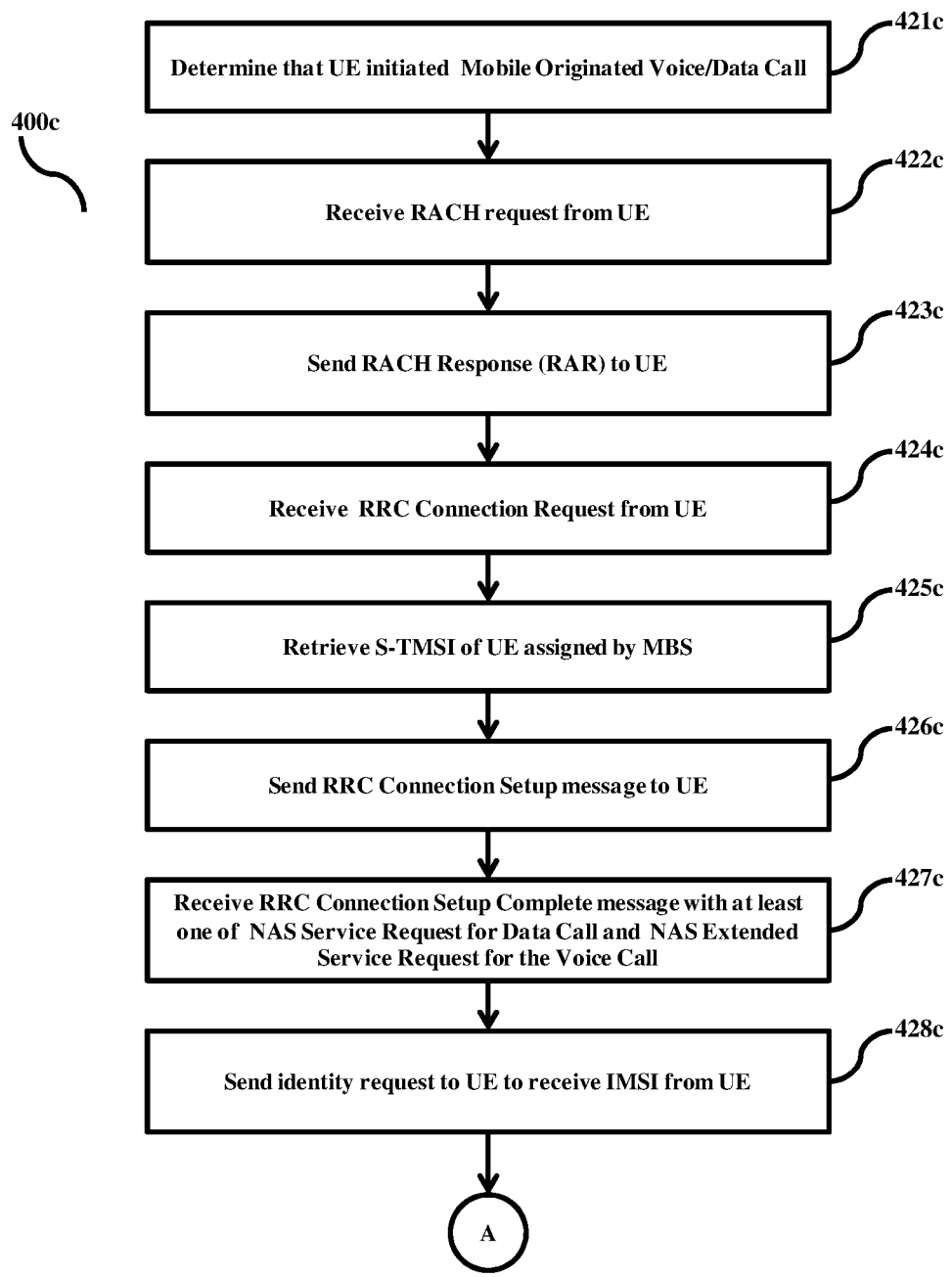
FIG. 4C is a flow chart illustrating another method for establishing a RRC connection by the portable PBS with the UE, according to an embodiment as disclosed herein.
Figure 4C:
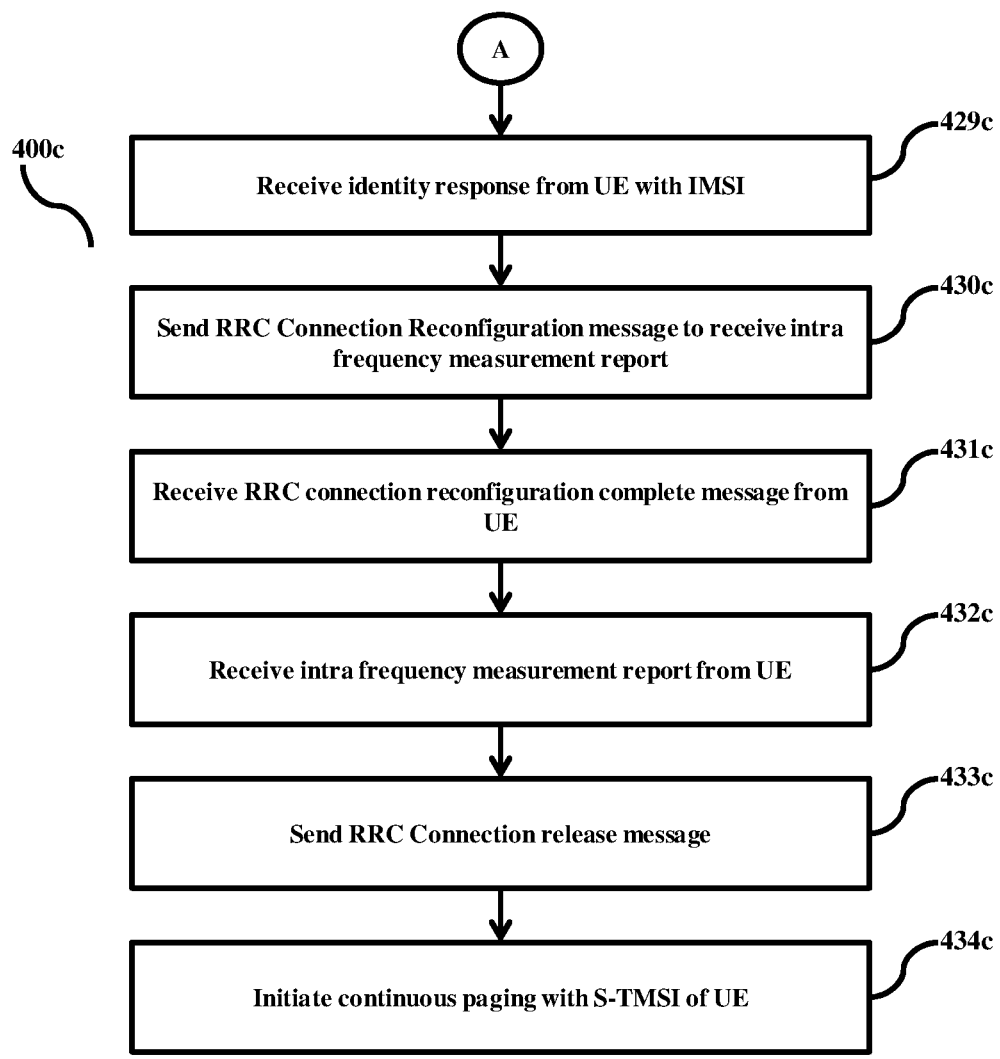

FIG. 4C is a flow chart 400c illustrating another method for establishing the RRC connection by the portable PBS 100 with the UE 200, according to an embodiment as disclosed herein.

Referring to the FIG. 4C, at step 421c, the portable PBS 100 determines that the UE 200 initiated the Mobile Originated Voice/Data Call. For example, in the portable PBS 100 as illustrated in the FIG. 2A, the Radio communication management engine 120 is configured to determine that the UE 200 initiated the Mobile Originated Voice/Data Call.

At step 422c, the portable PBS 100 receives the RACH request from the UE 200. For example, in the portable PBS 100 as illustrated in the FIG. 2A, the Radio communication management engine 120 is configured to receive the RACH request from the UE 200.

At step 423c, the portable PBS 100 sends the RACH Response (RAR) to the UE 200. For example, in the portable PBS 100 as illustrated in the FIG. 2A, the Radio communication management engine 120 is configured to send the RACH Response (RAR) to the UE 200.

At step 424c, the portable PBS 100 receives the RRC Connection Request from the UE 200. For example, in the portable PBS 100 as illustrated in the FIG. 2A, the Radio communication management engine 120 is configured to receive the RRC Connection Request from the UE 200.

At step 425c, the portable PBS 100 retrieves the S-TMSI of the UE 200 assigned by the MBS 250. For example, in the portable PBS 100 as illustrated in the FIG. 2A, the Radio communication management engine 120 is configured to retrieve the S-TMSI of the UE 200 assigned by the MBS 250.

At step 426c, the portable PBS 100 sends the RRC Connection Setup message to the UE 200. For example, in the portable PBS 100 as illustrated in the FIG. 2A, the Radio communication management engine 120 is configured to send the RRC Connection Setup message to the UE 200.

At step 427c, the portable PBS 100 receives the RRC Connection Setup Complete message with at least one of the NAS Service Request for the Data Call and the NAS Extended Service Request for the Voice Call. For example, in the portable PBS 100 as illustrated in the FIG. 2A, the Radio communication management engine 120 is configured to receive the RRC Connection Setup Complete message with at least one of the NAS Service Request for the Data Call and the NAS Extended Service Request for the Voice Call.

At step 428c, the portable PBS 100 sends the identity request to the UE 200 to receive the IMSI from the UE 200. For example, in the portable PBS 100 as illustrated in the FIG. 2A, the Radio communication management engine 120 is configured to send the identity request to the UE 200 to receive the IMSI from the UE 200.

At step 429c, the portable PBS 100 receives the identity response from the UE 200 with the IMSI. For example, in the portable PBS 100 as illustrated in the FIG. 2A, the Radio communication management engine 120 is configured to receive the identity response from the UE 200 with the IMSI.

At step 430c, the portable PBS 100 sends the RRC Connection Reconfiguration message to receive the intra frequency measurement report. For example, in the portable PBS 100 as illustrated in the FIG. 2A, the Radio communication management engine 120 is configured to send the RRC Connection Reconfiguration message to receive the intra frequency measurement report.

At step 431c, the portable PBS 100 receives the RRC connection reconfiguration complete message from the UE 200. For example, in the portable PBS 100 as illustrated in the FIG. 2A, the Radio communication management engine 120 is configured to receive the RRC connection reconfiguration complete message from the UE 200.

At step 432c, the portable PBS 100 receives the intra frequency measurement report from the UE 200. For example, in the portable PBS 100 as illustrated in the FIG. 2A, the Radio communication management engine 120 is configured to receive the intra frequency measurement report from the UE 200.

At step 433c, the portable PBS 100 sends the RRC Connection release message. For example, in the portable PBS 100 as illustrated in the FIG. 2A, the Radio communication management engine 120 is configured to send the RRC Connection release message.

At step 434c, the portable PBS 100 initiates the continuous paging with S-TMSI of the UE 200. For example, in the portable PBS 100 as illustrated in the FIG. 2A, the Radio communication management engine 120 is configured to 100 initiate the continuous paging with S-TMSI of the UE 200.

Figure 4D:
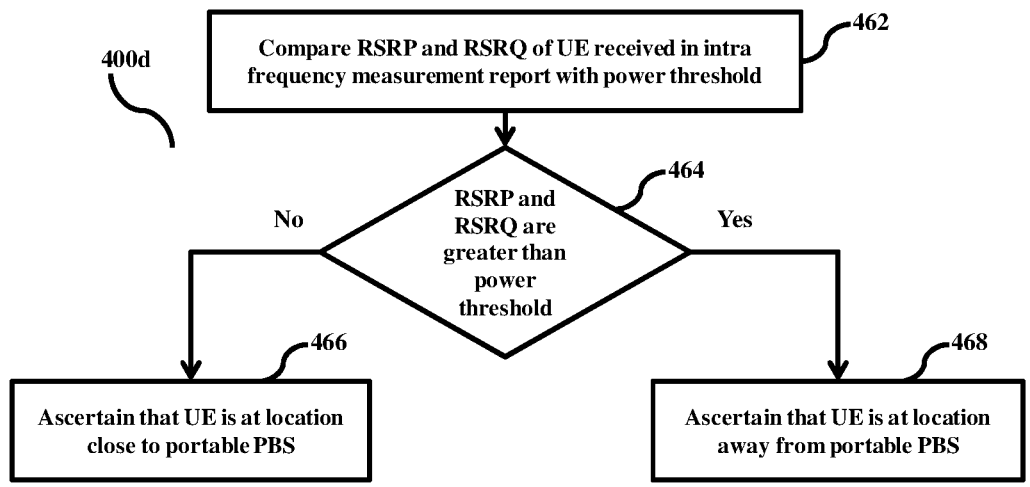
FIG. 4D is a flow chart illustrating a method for determining the location of the UE using the intra frequency measurement report, according to an embodiment as disclosed herein.

FIG. 4D is a flow chart 400d illustrating a method for determining the location of the UE 200 using the intra frequency measurement report, according to an embodiment as disclosed herein.

Referring to the FIG. 4D, at step 462, the portable PBS 100 compares the RSRP and the RSRQ of the UE 200 received in intra frequency measurement report with the power threshold. For example, in the portable PBS 100 as illustrated in the FIG. 2A, the Radio communication management engine 120 is configured to compares the RSRP and the RSRQ of the UE 200 received in the intra frequency measurement report with the power threshold.

At step 464, the portable PBS 100 determines whether the RSRP and the RSRQ are greater than the power threshold. For example, in the portable PBS 100 as illustrated in the FIG. 2A, the Radio communication management engine 120 is configured to determine whether the RSRP and the RSRQ are greater than the power threshold.

On determining that the RSRP and the RSRQ are not greater than the power threshold, at step 466, the portable PBS 100 ascertains that the UE 200 is at the location close to the portable PBS 100.

On determining that the RSRP and the RSRQ are greater than the power threshold, at step 468, the portable PBS 100 ascertains that the UE 200 is at the location away from the portable PBS 100.

Figure 5:
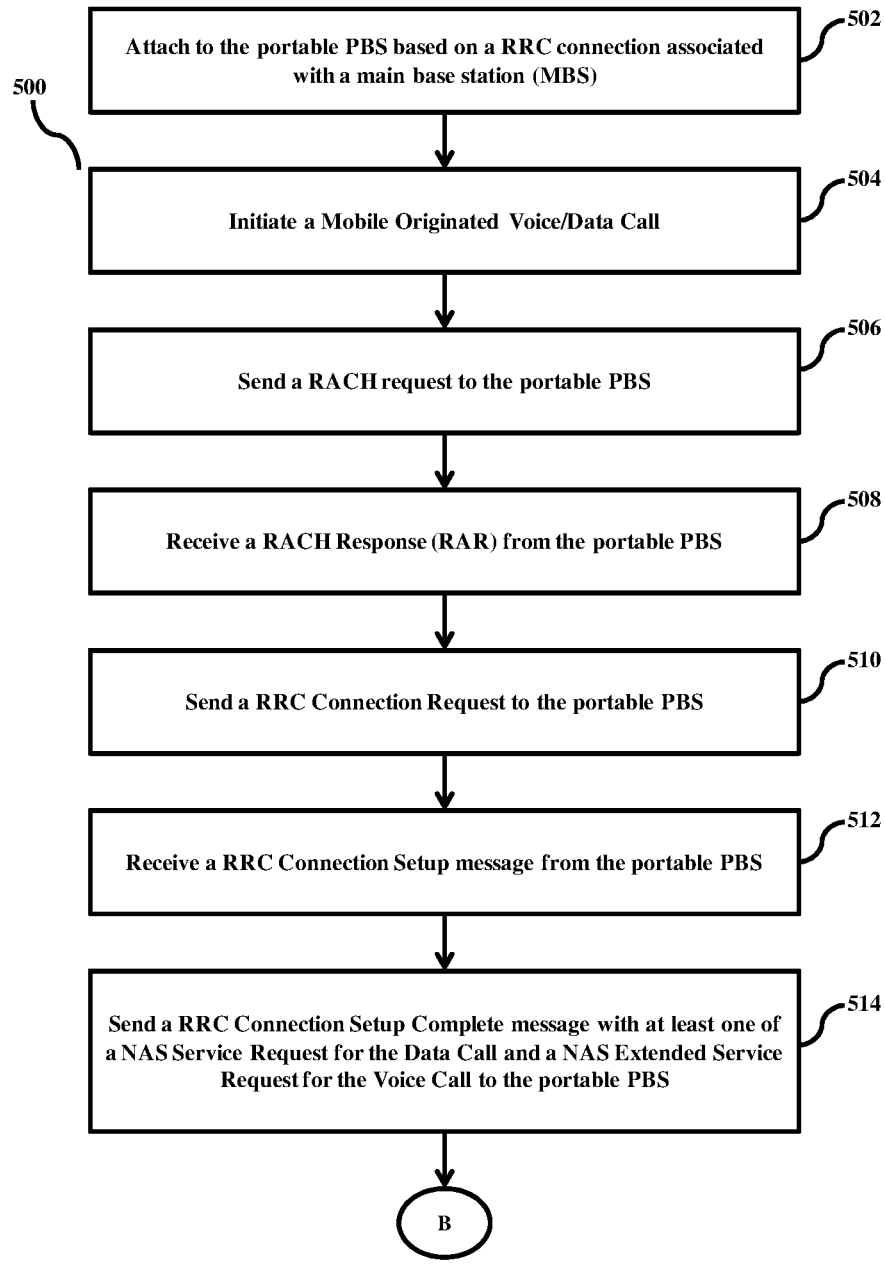
FIG. 5 is a flow chart illustrating a method for attaching and sending the intra frequency measurement report by the UE to the portable PBS, according to an embodiment as disclosed herein.
Figure 5:
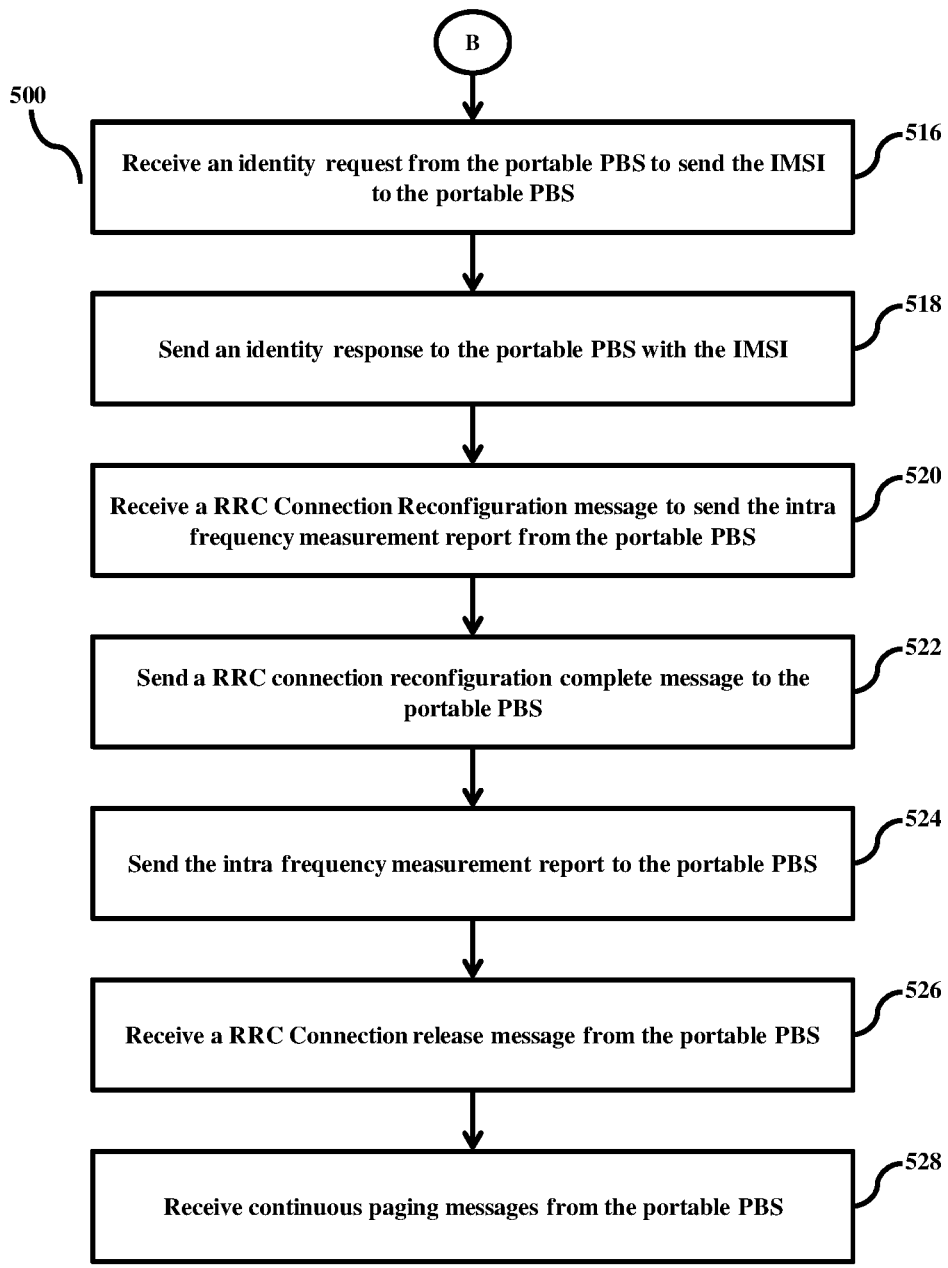

FIG. 5 is a flow chart 500 illustrating a method for attaching and sending the intra frequency measurement report by the UE 200 to the portable PBS 100, according to an embodiment as disclosed herein.

Referring to the FIG. 5, at step 502, the UE 200 attaches to the portable PBS 100 based on the RRC connection associated with the MBS 250. For example, in the UE 200 as illustrated in the FIG. 3, the function management engine 220 is configured to attach to the portable PBS 100 based on the RRC connection associated with the MBS 250.

At step 504, the UE 200 initiates the Mobile Originated Voice/Data Call. For example, in the UE 200 as illustrated in the FIG. 3, the function management engine 220 is configured to initiate the Mobile Originated Voice/Data Call.

At step 506, the UE 200 sends the RACH request to the portable PBS 100. For example, in the UE 200 as illustrated in the FIG. 3, the function management engine 220 is configured to send the RACH request to the portable PBS 100.

At step 508, the UE 200 receives the RACH Response (RAR) from the portable PBS 100. For example, in the UE 200 as illustrated in the FIG. 3, the function management engine 220 is configured to receive the RACH Response (RAR) from the portable PBS 100.

At step 510, the UE 200 sends the RRC Connection Request to the portable PBS 100. For example, in the UE 200 as illustrated in the FIG. 3, the function management engine 220 is configured to send the RRC Connection Request to the portable PBS 100.

At step 512, the UE 200 receives the RRC Connection Setup message from the portable PBS 100. For example, in the UE 200 as illustrated in the FIG. 3, the function management engine 220 is configured to receive the RRC Connection Setup message from the portable PBS 100.

At step 514, the UE 200 sends the RRC Connection Setup Complete message with at least one of the NAS Service Request for the Data Call and the NAS Extended Service Request for the Voice Call to the portable PBS 100. For example, in the UE 200 as illustrated in the FIG. 3, the function management engine 220 is configured to send the RRC Connection Setup Complete message with at least one of the NAS Service Request for the Data Call and the NAS Extended Service Request for the Voice Call to the portable PBS 100.

At step 516, the UE 200 receives the identity request from the portable PBS 100 to send the IMSI to the portable PBS 100. For example, in the UE 200 as illustrated in the FIG. 3, the function management engine 220 is configured to receive the identity request from the portable PBS 100 to send the IMSI to the portable PBS 100.

At step 518, the UE 200 sends the identity response to the portable PBS 100 with the IMSI. For example, in the UE 200 as illustrated in the FIG. 3, the function management engine 220 is configured to send the identity response to the portable PBS 100 with the IMSI.

At step 520, the UE 200 receives the RRC Connection Reconfiguration message to send the intra frequency measurement report from the portable PBS 100. For example, in the UE 200 as illustrated in the FIG. 3, the function management engine 220 is configured to receive the RRC Connection Reconfiguration message to send the intra frequency measurement report from the portable PBS 100.

At step 522, the UE 200 sends the RRC connection reconfiguration complete message to the portable PBS 100. For example, in the UE 200 as illustrated in the FIG. 3, the function management engine 220 is configured to send the RRC connection reconfiguration complete message to the portable PBS 100.

At step 524, the UE 200 sends the intra frequency measurement report to the portable PBS 100. For example, in the UE 200 as illustrated in the FIG. 3, the function management engine 220 is configured to send the intra frequency measurement report to the portable PBS 100.

At step 526, the UE 200 receives the RRC Connection release message from the portable PBS 100. For example, in the UE 200 as illustrated in the FIG. 3, the function management engine 220 is configured to receive the RRC Connection release message from the portable PBS 100.

At step 528, the UE 200 receives the continuous paging messages from the portable PBS 100. For example, in the UE 200 as illustrated in the FIG. 3, the function management engine 220 is configured to receive the continuous paging messages from the portable PBS 100.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 6:
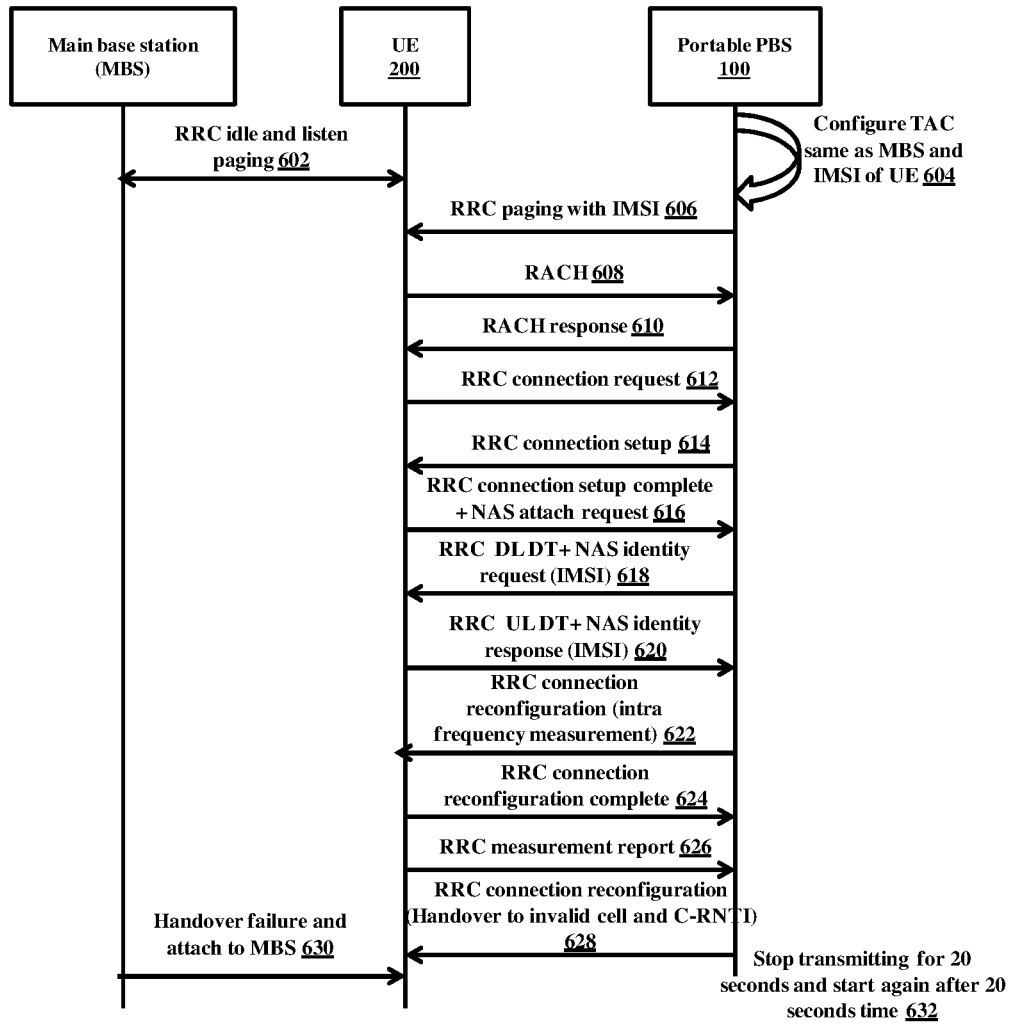
FIG. 6 is a sequence diagram illustrating an attachment of the UE to the Portable PBS based on a paging message, according to an embodiment as disclosed herein.

FIG. 6 is a sequence diagram illustrating the attachment of the UE 200 to the Portable PBS 100 based on the paging message, according to an embodiment as disclosed herein.

Referring to the FIG. 6, at step 602, a RRC idle status is establishes between the MBS 250 and the UE 200. The RRC idle status enables the UE 200 to establish an RRC connection for signaling or data transfer with the MBS 250 as well as be able to receive possible incoming connections (via paging). At step 604, the portable PBS 100 is configured with the System Information Block (SIB) Parameters and the TAC of the MBS 250 and the IMSI of the UE 200, to determine whether the UE 200 is present within the range of the portable PBS 100. Further, the portable PBS 100 is also configured with an E-UTRA Absolute Radio Frequency Channel Number (EARFCN) where carrier frequency in uplink and downlink are designated by the EARFCN. However, a Physical Cell Id (PCI) and a Network Cell Id of the MBS 250 are not configured to the portable PBS 100. The portable PBS 100 must be configured with a higher power to find the UE 200 within the range.

At step 606, the portable PBS 100 sends the IMSI to the UE 200. AT step 608, the UE 200 responds with the Random Access Procedure (RACH) message in order to be synchronized with the portable PBS 100 and the portable PBS 100 responds by sending the RACH response (step 610). Further, the portable PBS 100 sends the RRC connection setup (step 614) in response to the RRC connection request 612 received from the UE 200. The UE 200 responds with the RRC connection setup complete message along with the NAS attach request (step 616) after the RRC connection is setup between the UE 200 and the portable PBS 100.

Further, the portable PBS 100 requests for the IMSI from the UE 200 by sending the RRC DL DT+ NAS identity request (step 618), for which the UE 200 responds by sending the RRC UL DT+ NAS identity response which includes the IMSI (step 620). Further, the portable PBS 100 triggers the intra frequency measurement by sending the RRC Connection Reconfiguration message (step 622) to the UE 200. The UE 200 sends the RRC Connection Reconfiguration Complete message (step 624) followed by the intra frequency measurement report which includes the RSRP and the RSRQ (step 626). The intra frequency measurement report is used to determine the location of the UE 200 by comparing the comparing the RSRP and the RSRQ of the UE 200 with the power threshold and ascertaining that the UE 200 is at a location close to the portable PBS 100 when the RSRP and the RSRQ is below the power threshold. If the RSRP and the RSRQ is above the power threshold then, the portable PBS 100 ascertains that the UE is at a location away from the portable PBS 100. The UE 200 is triggered to perform the RACH procedure continuously, which will lead to drain of battery of the UE 200. Further, the RACH procedure is performed as a silent call and hence the UE 200 is not aware of the location being tracked by the portable PBS 100.

However, the S-TMSI is valid for a specific duration of time (e.g., 54 minutes) after which the S-TMSI expires and the UE 200 has to perform the registration procedure again to the MBS 250. The portable PBS 100 handover the UE 200 to a pseudo cell indicated by any PCI and a dummy C-RNTI due to which the handover fails. When the handover fails, the UE 200 tries to camp to the portable PBS 100 and the portable PBS 100 stops signal transmission by increasing the power of the signal beyond the power threshold which makes the portable PBS 100 invisible for a specific duration of time. Hence, the UE 200 is forced to register to the MBS 250 and obtain a new S-TMSI, after which the portable PBS 100 starts transmitting again.

Figure 7:
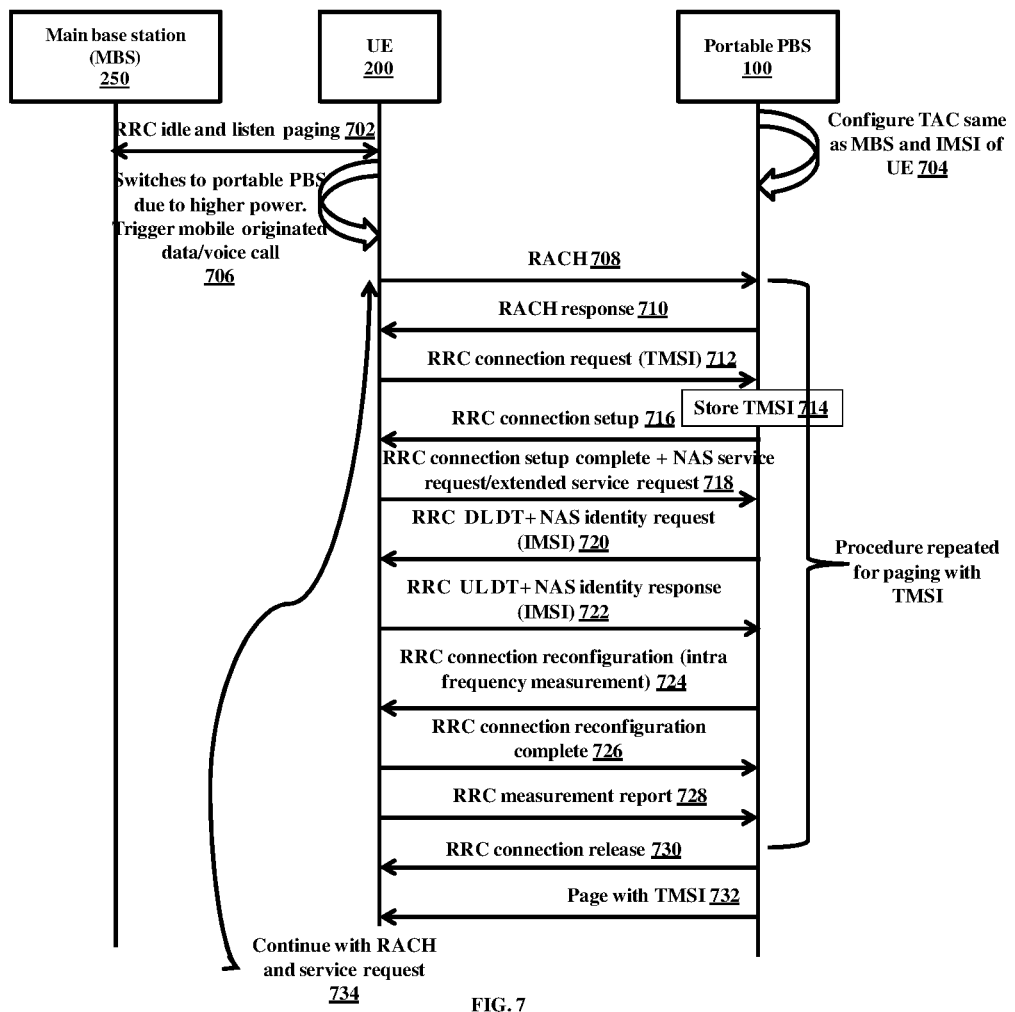
FIG. 7 is a sequence diagram illustrating an establishment of a RRC connection by the portable PBS with the UE for a Mobile Originated Voice/Data Call based on TMSI paging, according to an embodiment as disclosed herein.

FIG. 7 is a sequence diagram illustrating an establishment of the RRC connection by the portable PBS with the UE for a Mobile Originated Voice/Data Call based on TMSI paging, according to an embodiment as disclosed herein.

Referring to the FIG. 7, the portable PBS 100 is configured with the same TAC as the MBS 250 (step 704). The portable PBS 100 waits for the UE 200 to initiate the Mobile Originated Call (Voice/Data) to capture the TMSI assigned by the MBS 250 (step 706). The portable PBS 100 stores the TMSI of the UE 200 (step 714), when the portable PBS 100 receives the Service Request/Extended Service Request from the UE 200 (step 718). Once the TMSI is known, the portable PBS 100 will page with the TMSI to reinitiate the Service Request repeatedly. The UE 200 initiates the RACH procedure (step 708) in response to the paging message with the S-TMSI or the Mobile Originated Call. The portable PBS 100 sends Random Access Response (RAR) to the UE 200 (step 710). The UE 200 sends the RRC Connection Request to the portable PBS 100 with the TMSI (step 712). The portable PBS 100 responds with the RRC Connection Setup (step 716). The UE 200 sends the RRC Connection Setup Complete with NAS Service Request/Extended Service Request (step 718). The UE 200 starts a timer of 5 seconds in the NAS Service Request/Extended Service Request Initiated State (step 720). The UE 200 expects the Service Reject from the portable PBS 100/Access Stratum (AS) Indication from RRC layer (RRC Connection Reconfiguration with Handover/Release etc.). The portable PBS 100 sends the RRC Connection Reconfiguration to the UE 200 (step 724) for receiving the intra frequency measurement control. The UE 200 sends the intra frequency measurement report with the RSRP and the RSRQ value (step 728). The intra frequency measurement report is used to determine the location of the UE 200 by comparing the comparing the RSRP and the RSRQ of the UE 200 with the power threshold. The portable PBS 100 sends the RRC Connection Release (step 730) and starts continuous paging with the S-TMSI (step 732). The UE 200 responds with the service request if the S-TMSI is valid. The procedure continues till the UE 200 triggers the Detach Procedure/Attach Procedure/Tracking Area Update Procedure.

In general, the continuous paging will continue till the Periodic Tracking Area Update Timer (T3412) expires in the UE 200. The T3412 Timer value is provided in the Attach Accept/Tracking Area Accept message by the MBS 250. The default value for the T3412 timer is 54 minutes which is enough time to track the UE 200. The portable PBS 100 cannot trigger Attach Accept/Tracking Area Accept due to Integrity Protection in NAS message.

Figure 8:
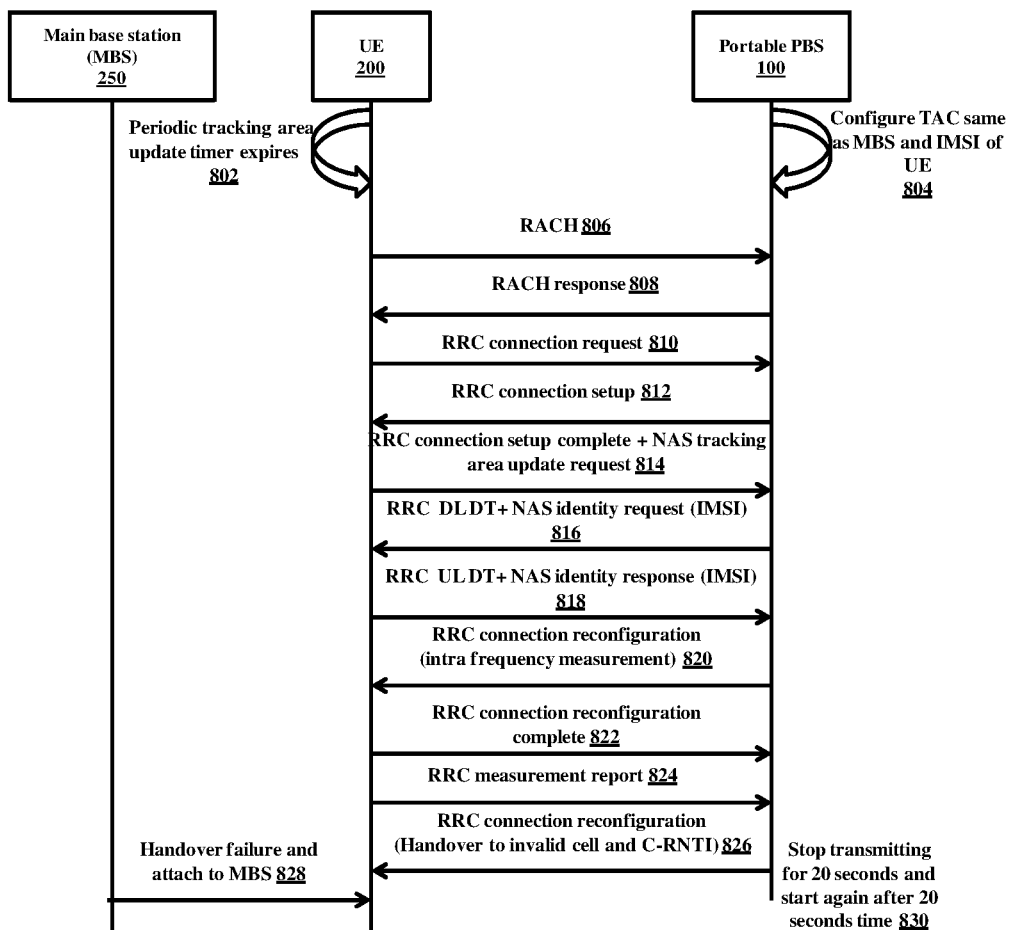
FIG. 8 is a sequence diagram illustrating a tacking area update procedure initiated by the UE with the portable PBS, according to an embodiment as disclosed herein.

FIG. 8 is a sequence diagram illustrating a tacking area update procedure initiated by the UE 200 with the portable PBS, according to an embodiment as disclosed herein.

Referring to the FIG. 8, the UE 200 determines that the periodic tracking area update timer (T3412) is expired (step 802) and sends the Tracking area update request to the portable PBS 100. Further, the portable PBS 100 sends the identity request to the UE 200 (step 816) and receives the identity response from the UE 200 (step 818). The identity response includes the IMSI. Further, at step 820, the portable PBS 100 sends the RRC Connection Reconfiguration message to the UE 200 requesting for the intra frequency measurement report. At step 822, the UE 200 sends the RRC connection reconfiguration complete message followed by the intra frequency measurement report with the RSRP and the RSRQ (step 826). Further, the portable PBS 100 handover the UE 200 with any PCI and dummy C-RNTI (step 828). At step 830, the portable PBS 100 stops the transmission for 20 seconds to let the UE 200 to register with the MBS 250. After 20 seconds, the portable PBS 100 will start transmitting again.

Figure 9:
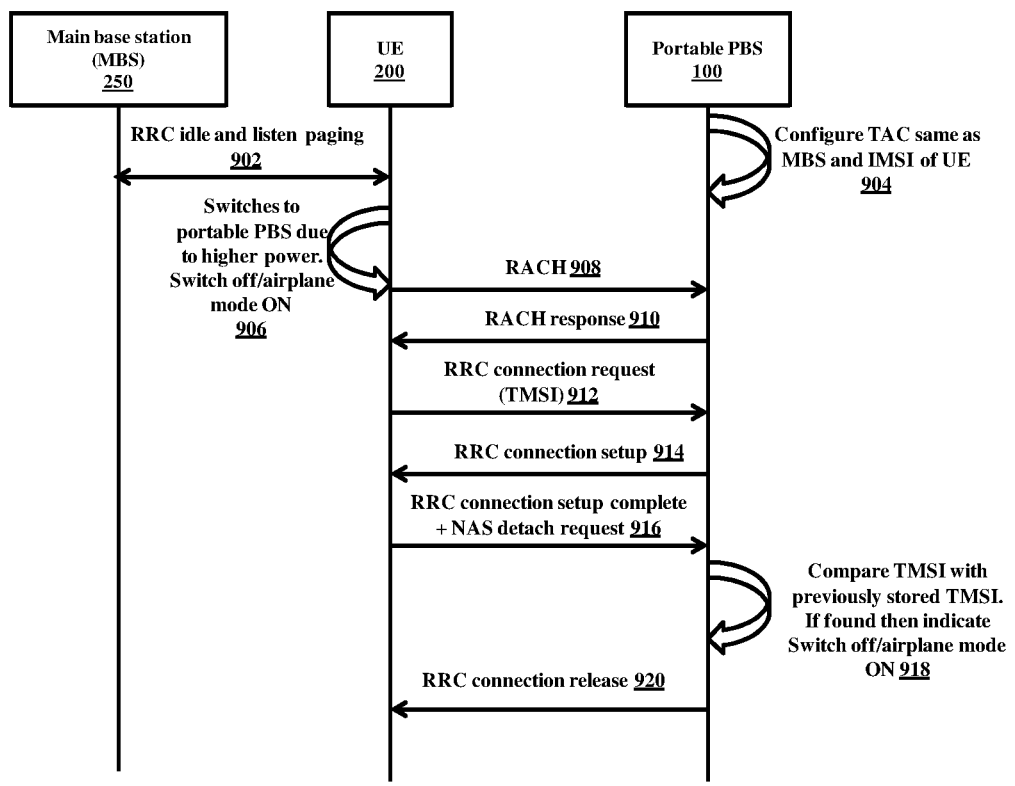
FIG. 9 is a sequence diagram illustrating a detach procedure initiated by the UE based on a RRC IDLE mode detach request, according to an embodiment as disclosed herein.

FIG. 9 is a sequence diagram illustrating a detach procedure initiated by the UE 200 based on the RRC IDLE mode detach request, according to an embodiment as disclosed herein.

Referring to the FIG. 9, in the RRC IDLE mode, the UE 200 listens to the paging messages (at step 902).

Further, once the UE 200 is attached to the portable PBS 100, then the portable PBS 100 can detect the RRC IDLE Mode Detach request is initiated by the UE 200, when the UE 200 triggers the switch off/airplane mode on as indicated in step 918. The portable PBS 100 compares the current TMSI of the UE 200 with the previously stored TMSI of the UE 200. In case the current TMSI of the UE 200 is same as the previously stored TMSI of the UE 200, then the portable PBS 100 determines that the UE 200 has triggered the switch off/airplane mode.

Figure 10:
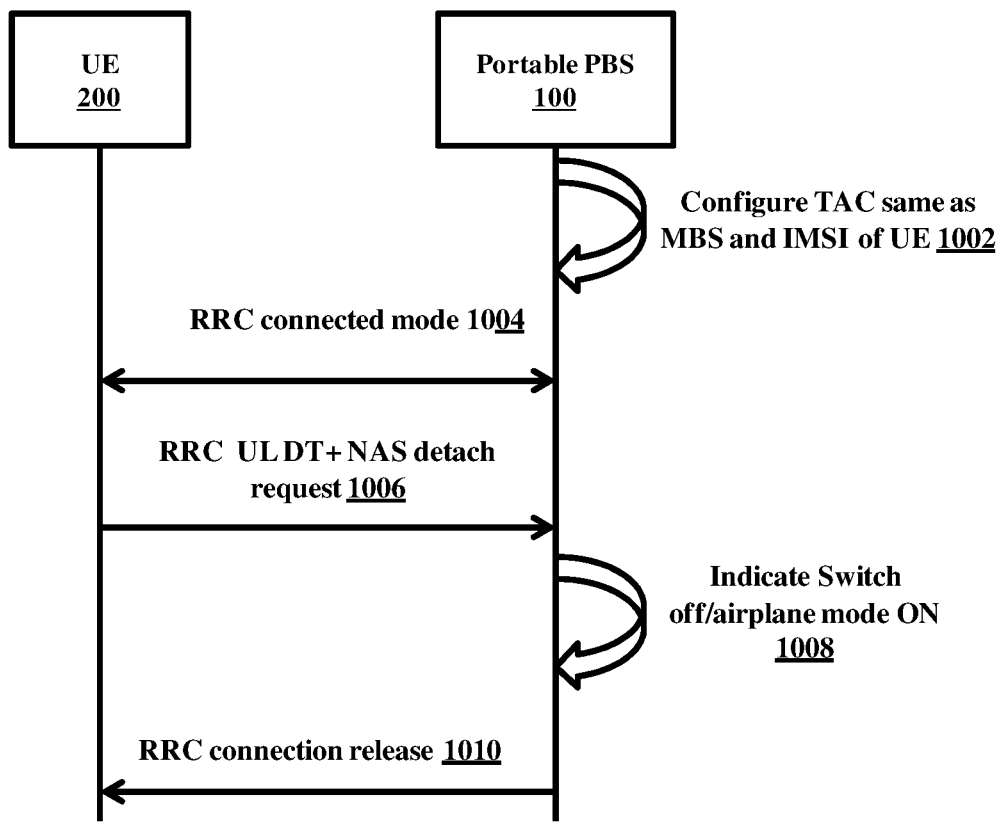
FIG. 10 is a sequence diagram illustrating a detach procedure initiated by the UE based on a RRC Connected mode detach request, according to an embodiment as disclosed herein.

FIG. 10 is a sequence diagram illustrating a detach procedure initiated by the UE 200 based on the RRC CONNECTED mode detach request, according to an embodiment as disclosed herein.

The UE 200 is in the RRC CONNECTED mode when the RRC connection is established between the UE 200 and the portable PBS 100. If the RRC connection is not established then the UE 200 is in the RRC IDLE mode. Referring to the FIG. 10, Further, once the UE 200 is attached to the portable PBS 100, then the portable PBS 100 can detect the RRC CONNECTED Mode Detach request is initiated by the UE 200, when the UE 200 triggers the switch off/airplane mode on as indicated in step 1008. Further, the portable PBS 200 sends the RRC connection release at step 1010 to release the UE 200 after which the UE 200 perform the registration process with the MBS 250 again.

The portable PBS 100 can detect the Emergency Call triggered by the UE 200 by decoding the RRC Connection Request with Cause as Emergency Call or Extended Service Request with Service Type as Emergency Call.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for determining a location of a user equipment (UE) using a portable pseudo base station (PBS), comprising:
    establishing, by the portable PBS, a RRC connection with the UE associated with a main base station (MBS), wherein a signal strength between the UE and the portable PBS is stronger than a signal strength between the UE and the MBS;

receiving, by the portable PBS, an intra frequency measurement report from the UE; and determining, by the portable PBS, the location of the UE using the intra frequency measurement report;

wherein establishing, by the portable PBS, the RRC connection with the UE comprises:

determining, by the portable PBS, that the UE initiated a Mobile Originated Voice/Data Call;

receiving, by the portable PBS, a RACH request from the UE;

sending, by the portable PBS, a RACH Response (RAR) to the UE;

receiving, by the portable PBS, a RRC Connection Request from the UE, wherein the RRC Connection Request includes a SAE Temporary Mobile Subscriber Identity (S-TMSI);

retrieving, by the portable PBS, the S-TMSI of the UE assigned by the MBS;

sending, by the portable PBS, a RRC Connection Setup message to the UE;

receiving, by the portable PBS, a RRC Connection Setup Complete message with at least one of a NAS Service Request for the Data Call and a NAS Extended Service Request for the Voice Call;

sending, by the portable PBS, an identity request to the UE to receive the IMSI from the UE;

receiving, by the portable PBS, an identity response from the UE with the IMSI;

sending, by the portable PBS, a RRC Connection Reconfiguration message to receive the intra frequency measurement report;

receiving, by the portable PBS, a RRC connection reconfiguration complete message from the UE;

receiving, by the portable PBS, the intra frequency measurement report from the UE;

sending, by the portable PBS, a RRC Connection release message; and initiating, by the portable PBS, a continuous paging with the S25 TMSI of the UE.

2. The method of claim 1, wherein the signal strength between the UE and the portable PBS is controlled by moving the portable PBS.

3. The method of claim 1, wherein establishing, by the portable PBS, the RRC connection with the UE associated with the MBS comprises:

determining a Tracking Area Code (TAC) while the UE is receiving the TAC form the MBS, wherein the TAC is determined by decoding a broadcast message sent by the MBS to the UE;

configuring the TAC of the MBS and an international mobile subscriber identity (IMSI) of the UE to the portable PBS; and performing an attachment of the UE to the portable PBS by sending an IMSI paging message to the UE, wherein the attachment of the UE to the portable PBS includes the UE performing an attach procedure.

4. The method of claim 3, wherein performing, the attachment of the UE to the portable PBS by sending the IMSI paging message to the UE comprises:

sending, by the portable PBS, the paging message with the international mobile subscriber identity (IMSI) to the UE;

receiving, by the portable PBS, an attach request from the UE;

sending, by the portable PBS, an identity request to the UE to receive the IMSI from the UE;

receiving, by the portable PBS, an identity response from the UE with the IMSI;

sending, by the portable PBS, a RRC Connection Reconfiguration message to receive the intra frequency measurement report;

receiving, by the portable PBS, the RRC connection reconfiguration complete message from the UE;

receiving, by the portable PBS, the intra frequency measurement report from the UE;

initiating, by the portable PBS, a handover of the UE with a pseudo Physical Cell Identifier (PCI) and a pseudo C-RNTI; and switching-off, by the portable PBS, transmission of power by the portable PBS for a predetermined time period, wherein the UE registers again to the MBS during the switching-off of the transmission of power.

5. The method of claim 1, further comprises:

determining, by the UE, that the S-TMSI provided by the portable PBS in the continuous paging is valid;

sending, by the UE, a service request to the portable PBS; and initiating, by the UE, at least one of a Detach Procedure, an Attach Procedure and a Tracking Area Update Procedure with the portable PBS.

6. The method of claim 5, wherein the UE initiates the detach procedure by triggering at least one of a switch off and an airplane mode on.

7. The method of claim 5, wherein the portable PBS detects the detach procedure initiated by the UE based on a RRC IDLE mode detach request.

8. The method of claim 5, wherein the portable PBS detects the detach procedure initiated by the UE based on a RRC Connected mode detach request.

9. The method of claim 1, wherein initiating, by the UE, the tacking area update procedure comprises:

determining, by the UE, that a periodic tracking area update timer is expired;

sending, by the UE, a Tracking area update request to the portable PBS, in response to determining that the periodic tracking area update timer is expired;

receiving, by the UE, the identity request from the portable PBS;

sending, by the UE, the identity response to the portable PBS, wherein the identity response includes the IMSI;

receiving, by the UE, a RRC Connection Reconfiguration message to send the intra frequency measurement report;

sending, by the UE, a RRC connection reconfiguration complete message; and sending by the UE, the intra frequency measurement report.

10. The method of claim 1, wherein the SAE temporary mobile subscriber identity (S-TMSI) is valid for a specific period of time.

11. The method of claim 1, wherein the S-TMSI is allocated to the UE by the MBS.

12. The method of claim 1, wherein the intra frequency measurement 25 report includes a Reference Signals Received Power (RSRP) and a Reference Signal Received Quality (RSRQ).

13. The method of claim 1, wherein determining, by the portable PBS, the location of the UE using the intra frequency measurement report comprises:

comparing the RSRP and the RSRQ of the UE received in the intra frequency measurement report with a power threshold;

ascertaining that the UE is at a location close to the portable PBS, when the RSRP and the RSRQ is below the power threshold; and
ascertaining that the UE is at a location farther from the portable PBS, when the RSRP and the RSRQ is above the power threshold.

14. A portable pseudo base station for determining a location of a user equipment (UE), comprising:
a memory;
a processor coupled to the memory;
a radio communication engine coupled to the memory and the processor, configured to:
establish a RRC connection with the UE associated with a main base station (MBS), wherein a signal strength between the UE and the portable PBS is stronger than a signal strength between the UE and the MBS;
receive an intra frequency measurement report from the UE; and
determine the location of the UE using the intra frequency measurement report;
wherein establishing an RRC connection with the UE comprises:
determining that the UE initiated a Mobile Originated Voice/Data Call;
receiving a RACH request from the UE;
sending a RACH Response (RAR) to the UE;
receiving a RRC Connection Request from the UE, wherein the RRC Connection Request includes a SAE Temporary Mobile Subscriber Identity (S-TMSI);
retrieving the S-TMSI of the UE assigned by the MBS;
sending a RRC Connection Setup message to the UE;
receiving a RRC Connection Setup Complete message with at least one of a NAS Service Request for the Data Call and a NAS Extended Service Request for the Voice Call;
sending an identity request to the UE to receive the IMSI from the UE;
receiving an identity response from the UE with the IMSI;
sending a RRC Connection Reconfiguration message to receive the intra frequency measurement report;
receiving a RRC connection reconfiguration complete message from the UE;
receiving the intra frequency measurement report from the UE;
sending, by the portable base station, a RRC Connection release message; and
initiating a continuous paging with the S-TMSI of the UE.

15. The portable PBS of claim 14, wherein the signal strength between the UE and the PBS is controlled by moving the portable PBS.

16. The portable PBS of claim 14, wherein the radio communication engine is configured to establish the RRC connection with the UE associated with the MBS comprises:
determine a Tracking Area Code (TAC) while the UE is receiving the TAC form the MBS, wherein the TAC is determined by decoding a broadcast message sent by the MBS to the UE;
configure the TAC of the MBS and an international mobile subscriber identity (IMSI) of the UE to the portable PBS; and
perform an attachment of the UE to the portable PBS by sending an IMSI paging message to the UE, wherein the attachment of the UE to the portable PBS includes the UE performing an attach procedure.

17. The portable PBS of claim 16, wherein perform the attachment of the UE to the portable PBS by sending the paging message to the UE comprises:
send the paging message with an international mobile subscriber identity (IMSI) to the UE;
receive an attach request from the UE;
send an identity request to the UE to receive the IMSI from the UE; and
receive an identity response from the UE with the IMSI; and
send a RRC Connection Reconfiguration message to receive the intra frequency measurement report;
receive the RRC connection reconfiguration complete message from the UE;
receive the intra frequency measurement report from the UE;
initiate a handover of the UE with a pseudo Physical Cell Identifier (PCI) and a pseudo C-RNTI; and
switch-off transmission of power by the portable PBS for a predetermined time period, wherein the UE registers again to the MBS during the switching-off of the transmission of power.

18. A user equipment (UE) attached to a portable pseudo base station (PBS), comprising:
a memory;
a processor coupled to the memory;
a function management engine coupled to the memory and the processor, configured to:
attach to the portable PBS based on a RRC connection associated with a main base station (MBS), wherein a signal strength between the UE and the portable PBS is stronger than a signal strength between the UE and the MBS;
initiate a Mobile Originated Voice/Data Call;
send a RACH request to the portable PBS;
receive a RACH Response (RAR) from the portable PBS;
send a RRC Connection Request to the portable PBS, wherein the RRC Connection Request includes a SAE Temporary Mobile Subscriber Identity (S-TMSI);
receive a RRC Connection Setup message from the portable PBS;
send a RRC Connection Setup Complete message with at least one of a NAS Service Request for the Data Call and a NAS Extended Service Request for the Voice Call to the portable PBS;
receive an identity request from the portable PBS to send the IMSI to the portable PBS;
send an identity response to the portable PBS with the IMSI;
receive a RRC Connection Reconfiguration message to send the intra frequency measurement report from the portable PBS;
send a RRC connection reconfiguration complete message to the portable PBS; send the intra frequency measurement report to the portable PBS;
receive a RRC Connection release message from the portable PBS; and receive continuous paging messages from the portable PBS.

19. The UE of claim 18, wherein the function management engine is further configured to:

determine that the S-TMSI provided by the portable PBS in the 15 continuous paging is valid;

send a service request to the portable PBS;

initiate at least one of a Detach Procedure, an Attach Procedure and a Tracking Area Update Procedure with the portable PBS.

20. The UE of claim 19, wherein the function management engine is configured to initiate the tacking area update procedure comprises:

determine that a periodic tracking area update timer is expired;

send a Tracking area update request to the portable PBS, in response to determining that the periodic tracking area update timer is expired;

receive the identity request from the portable PBS;

send the identity response to the portable PBS, wherein the identity response includes the IMSI;

receive a RRC Connection Reconfiguration message to send the intra frequency measurement report to the portable PBS;

send a RRC connection reconfiguration complete message to the portable PBS; and send the intra frequency measurement report to the portable PBS.

21. The UE of claim 19, wherein the UE initiates the detach procedure by triggering at least one of a switch off and an airplane mode on.

22. The UE of claim 19, wherein the portable PBS detects the detach procedure initiated by the UE based on a RRC IDLE mode detach request.

23. The UE of claim 19, wherein the portable PBS detects the detach procedure initiated by the UE based on a RRC Connected mode detach request.

24. The UE of claim 18, wherein the SAE temporary mobile subscriber identity (S-TMSI) is valid for a specific period of time.

25. The UE of claim 18, wherein the S-TMSI is allocated to the UE by the MBS.

26. The UE of claim 18, wherein the intra frequency measurement report includes a Reference Signals Received Power (RSRP) and a Reference Signal Received Quality (RSRQ).

* * * * *